United States Patent
Tan

(10) Patent No.: US 6,604,722 B1
(45) Date of Patent: Aug. 12, 2003

(54) DISPLAY SUPPORT

(76) Inventor: Seng-Ling Tan, Block 2023 Bukit Batok Ind. Park A #02-106 ST 23, Singapore 659528 (SG)

( * ) Notice: Subject to any disclaimer, the term of this patent is extended or adjusted under 35 U.S.C. 154(b) by 0 days.

(21) Appl. No.: 10/166,243

(22) Filed: Jun. 10, 2002

(51) Int. Cl.$^7$ ................................................. E04G 3/00
(52) U.S. Cl. ..................... 248/276.1; 248/396; 248/923; 254/122
(58) Field of Search ................ 248/276.1, 284.1, 248/286.1, 292.12, 298.1, 396, 398, 394, 274.1, 447.1, 479, 480, 923, 454, 650, 927; 128/147; 254/122, 126

(56) References Cited

U.S. PATENT DOCUMENTS

| | | | | |
|---|---|---|---|---|
| 3,292,902 A | * | 12/1966 | Lynch | 254/122 |
| 3,782,713 A | * | 1/1974 | Yount | 269/297 |
| 3,968,949 A | * | 7/1976 | Romano, Jr. | 248/650 |
| 4,960,256 A | * | 10/1990 | Chihara et al. | 248/286.1 |
| 5,364,060 A | * | 11/1994 | Donovan et al. | 248/588 |
| 5,445,353 A | * | 8/1995 | Sakamoto | 248/421 |
| 5,765,797 A | * | 6/1998 | Greene et al. | 248/398 |
| 5,799,922 A | * | 9/1998 | Timms et al. | 248/564 |
| 5,823,976 A | * | 10/1998 | Cain et al. | 601/23 |
| 6,402,109 B1 | * | 6/2002 | Dittmer | 248/284.1 |

* cited by examiner

Primary Examiner—Ramon O. Ramirez
Assistant Examiner—Tan Le
(74) Attorney, Agent, or Firm—Alan D. Kamrath; Rider Bennett, LLP

(57) ABSTRACT

An display support has a yoke connecting between a securing plate and a pivot plate. The yoke has a linkage movably received between confining holes and a threaded bolt extending through a central hole in the securing plate to be screwingly connected to a nut. The yoke is pivotally connected to the pivot plate via a pivot. Therefore, adjustment of the nut changes the angle of the pivot plate relative to the securing plate.

3 Claims, 4 Drawing Sheets

DISPLAY SUPPORT

BACKGROUND OF THE INVENTION

1. Field of the Invention

The present invention relates to a display support, and more particularly to an display support securely attached to a wall and allowable to adjust the relative angle between the display to the wall so that the user is able to have the best angle to watch the picture from the display.

2. Description of Related Art

It is known in the past few years that a display is thin in thickness and has high resolution when compared with conventional television. Therefore, people love to use a display on the wall not only for practical use but also for decorative purpose. Unfortunately, the conventional support for the display is fixed to the wall so that the user can only sit in a particular position to watch the picture from the display. Otherwise, the user will have to use another auxiliary mechanism to alter the angle of the display so as to adopt to different positions of the users, such as a remote controlled rotating seat.

To overcome the shortcomings, the present invention tends to provide an improved display support to mitigate and obviate the aforementioned problems.

SUMMARY OF THE INVENTION

The primary objective of the present invention is to provide an improved display support which is able to adjust the angle of the display to the wall readily.

In order to accomplish the foregoing objective, the support has a pair of securing plates each having holes so defined that the pair of securing plates are able to be securely connected to a surface, a bend formed on a top portion of the securing plate and having a central hole defined therethrough, a pair of wings extending out from opposite sides of the securing plate and each having a confining hole defined to correspond to each other, a pair of folds extending in parallel to the pair of wings and each having a pivot hole defined in a bottom of the fold so that a rivet is able to be received between the folds to correspond to the two pivot holes respectively;

a pair of pivot plates each pivotally connected to a corresponding one of the securing plates and defining therein securing holes, two first pivot holes in a bottom of a pair of baffle plates extending out in parallel from the pivot plate and two second pivot holes in a top of the pair of baffle plates, wherein the two first pivot holes correspond to the two pivot holes of the securing plate so that a first pivot is able to be secured between the folds and the baffle plates via rivets and each of the two pivot plates is pivotal relative to the corresponding securing plate; and a pair of yokes each having two first engaging holes corresponding to the two confining holes, two second engaging holes to correspond to the two second pivot holes of the pivot plate, a second pivot corresponding to the two second engaging holes and the two second pivot holes so that the second pivot is able to be secured to the yoke and the pivot plate via a first securing element, a linkage extending through the two first engaging holes and received between the two wings to be limited in the confining holes by a first securing element, two threaded bolts each extending through the central hole to be screwingly connected to a nut.

Other objects, advantages and novel features of the invention will become more apparent from the following detailed description when taken in conjunction with the accompanying drawings.

DETAILED DESCRIPTION OF THE PREFERRED EMBODIMENT

Figure 1:
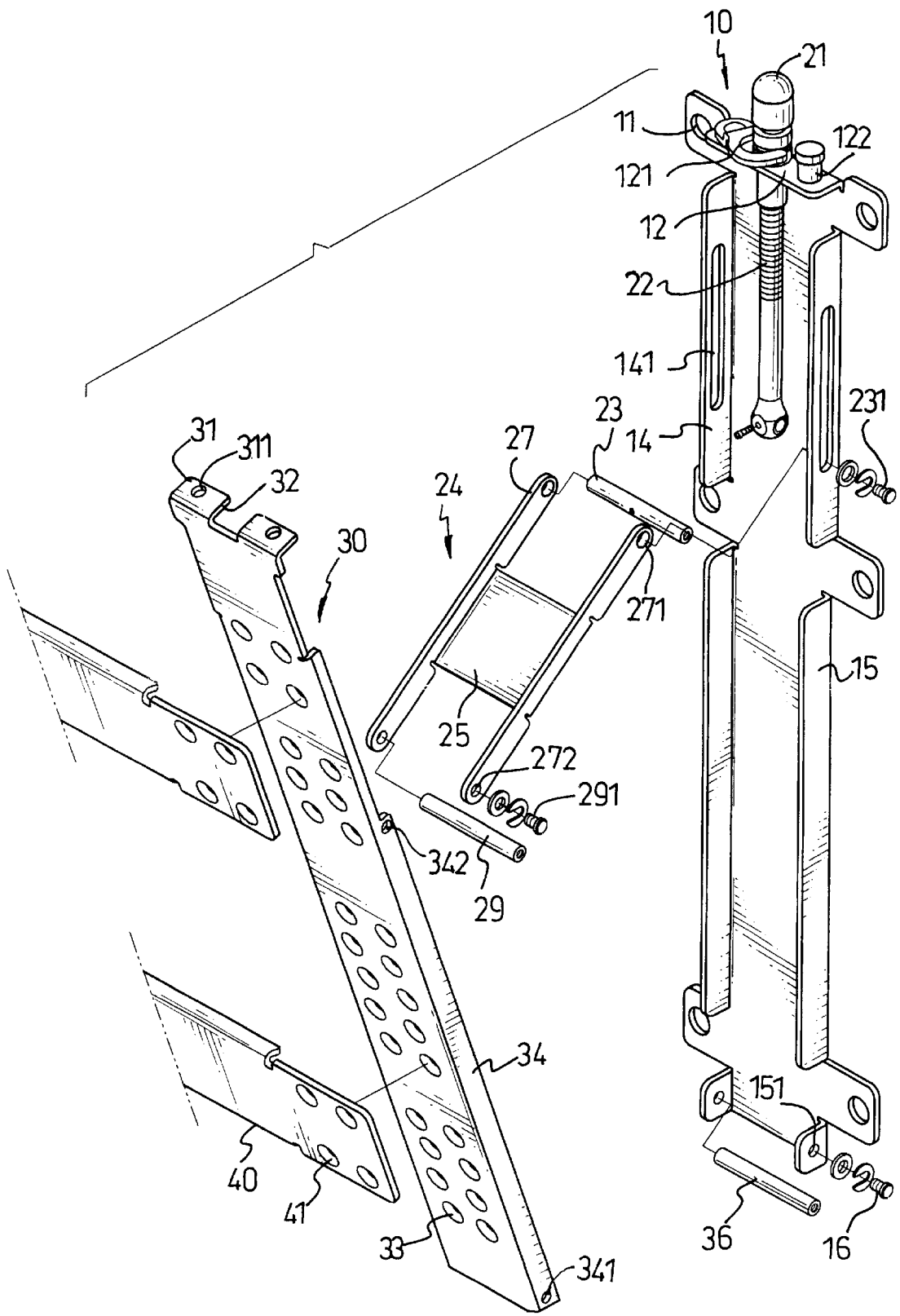
FIG. 1 is an exploded perspective view of one side of the display support.
Figure 2:
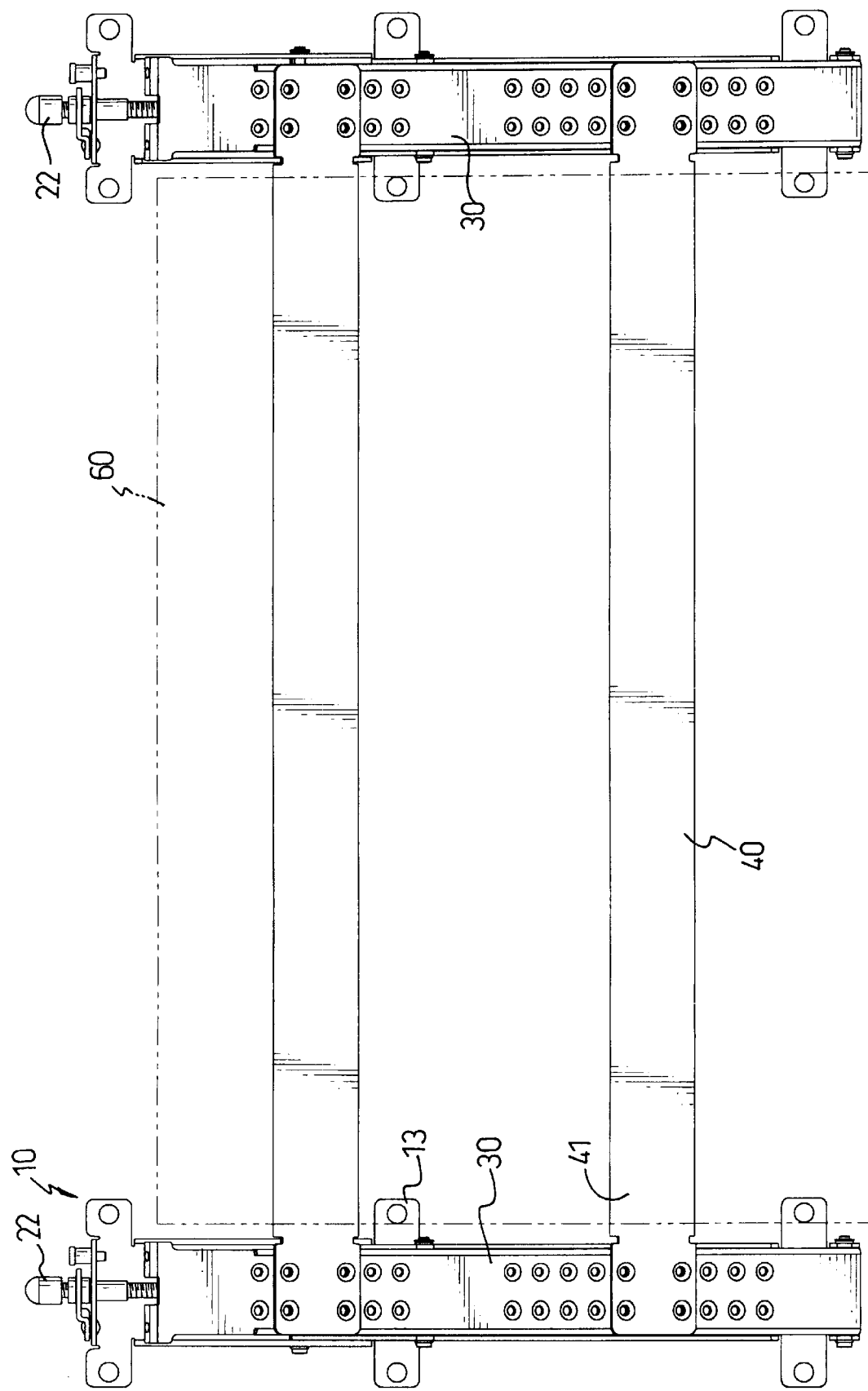
FIG. 2 is a plan view showing the assembled display support of the present invention.

With reference to FIGS. 1 and 2, the display support in accordance with the present invention has a pair of securing plates (10), two yokes (20), two pivot plates (30) and a pair of locking plates (40).

The securing plate (10) has multiple holes (11) so defined that the securing plate (10) is able to be securely attached to a wall by such as rivets, nails or the like. A bend (12) is formed on a top edge of the securing plate (10) and has a central hole (121) and two auxiliary holes (122). A pair of wings (14) extends perpendicularly to the securing plate (10) and each wing (14) has a confining hole (141) defined therethrough and corresponding to each other. A pair of folds (15) parallel to the pair of wings (14) are formed on the securing plate (10) and each fold (15) has a pivot hole (151) defined to correspond to a rivet (16).

The pivot plate (30) has a head (31) formed to correspond to the bend (12) of the securing plate (10) and defining therethrough mating holes (311) corresponding to the auxiliary holes (122) of the bend (12). A cutout (32) corresponding to the central hole (121) is defined in the head (31). The pivot plate (30) further has securing holes (33) and a pair of baffle plates (34) formed to correspond to the folds (15) of the securing plate (10) and each baffle plate (34) has a first pivot hole and a second pivot hole (341,342) defined to correspond to the first and second pivot holes (341,342) of the other baffle plate (34). A first pivot (36) is provided to be positioned between the folds (15) of the securing plate (10) and the baffle plates (34) of the pivot plate (30) enclose the folds (15) so that the first pivot holes (341) are able to correspond to and mate with the pivot holes (151).

The yoke (20) includes a nut (21), a threaded bolt (22) extending through the central hole (121) of the securing plate (10) to screwingly connect with the nut (21), a linkage (23) integrally connected to a distal end of the threaded bolt (22) and extending through the confining holes (141) of the wings (14) to be secured between the wings (14) by a securing element (231), such as a rivet, a nail or the like, and an engaging plate (24).

The engaging plate (24) has a connecting plate (25) with two walls (27) mutually in parallel with each other and formed on opposite sides of the connecting plate (25). Each wall (27) has a first engaging hole (271) and a second engaging hole (272) respectively defined in two distal ends of the wall (27). The second engaging holes (272) correspond to the second pivot holes (342) of the pivot plate (30). A second pivot (29) is positioned between the two walls (27) and the two baffle plates (34) by second securing elements (291) such as a rivet, a nail or the like extending through the aligned second pivot holes (342) and the second engaging holes (272).

Each locking plate (40) has multiple locking holes (41) defined in two distal ends of the locking plate (40) to correspond the securing holes (33) on the pivot plate (30) and two pairs of engaging plates (42) adapted to be securely connected to a back side of an display (60) (shown in dashed lines in FIG. 2)

When the support of the present invention is to be assembled, the first pivot (36) is received between the two folds (15) and aligns with the pivot holes (151) of the securing plate (10) and the first pivot holes (341) of the pivot plate (30). Then the rivets (16) are provided to secure the first pivot (36) such that the pivot plate (30) is able to pivot relative to the securing plate (10). The second pivot (29) is received between the two walls (27) and aligns with the second engaging holes (272) and the second pivot holes (342) of the pivot plate (30). Then the second securing element (291) is provided to secure the second pivot (29) between the two walls (27) and the two baffle plates (34). The linkage (23) is placed between the two wings (14) with the threaded bolt (22) extending through the central hole (121) and the cutout (32) to be screwingly connected with the nut (21). Thereafter the securing element (231) is applied to secure the linkage (23) so that the pivotal movement of the pivot plate (30) is limited by the movement of the linkage (23) along the confining holes (141).

When the foregoing assembly is finished, two locking plates (40) are vertically placed between two pivot plates (30) in parallel with the locking holes (41) in both distal ends of the locking plates (40) aligned with the securing holes (33) in each of the pivot plates (30). Nails, rivets or the like are provided to secure the engagement of the locking plates (40) and the pivot plates (30). Then the two engaging plates (42) are placed against the two locking plates (40) respectively so as to secure the display (60) on the support of the present invention.

Figure 3:
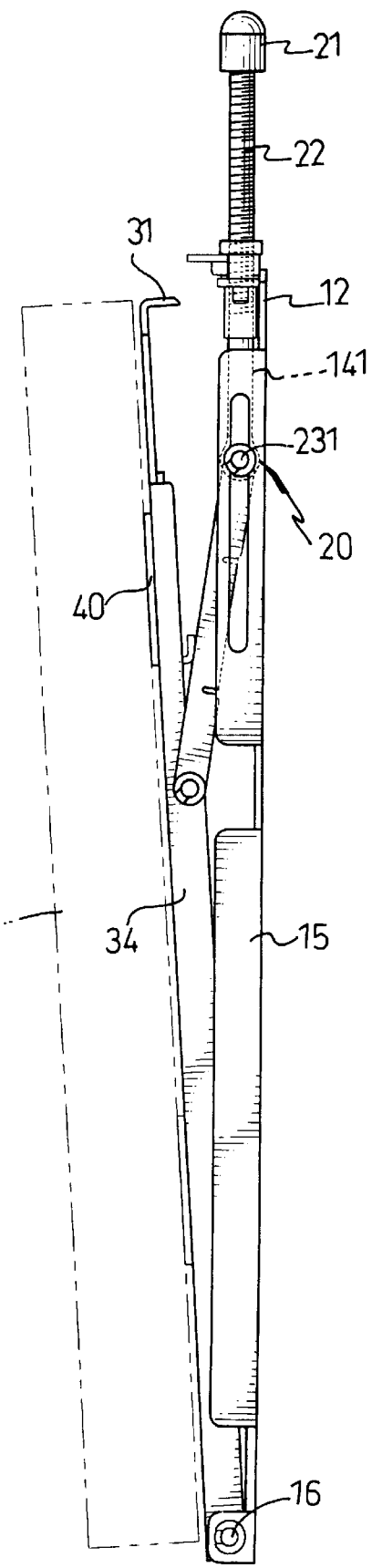
FIG. 3 is a schematic side view showing the display support of the present invention is securely attached to a wall and has an display mounted to the display support.
Figure 4:
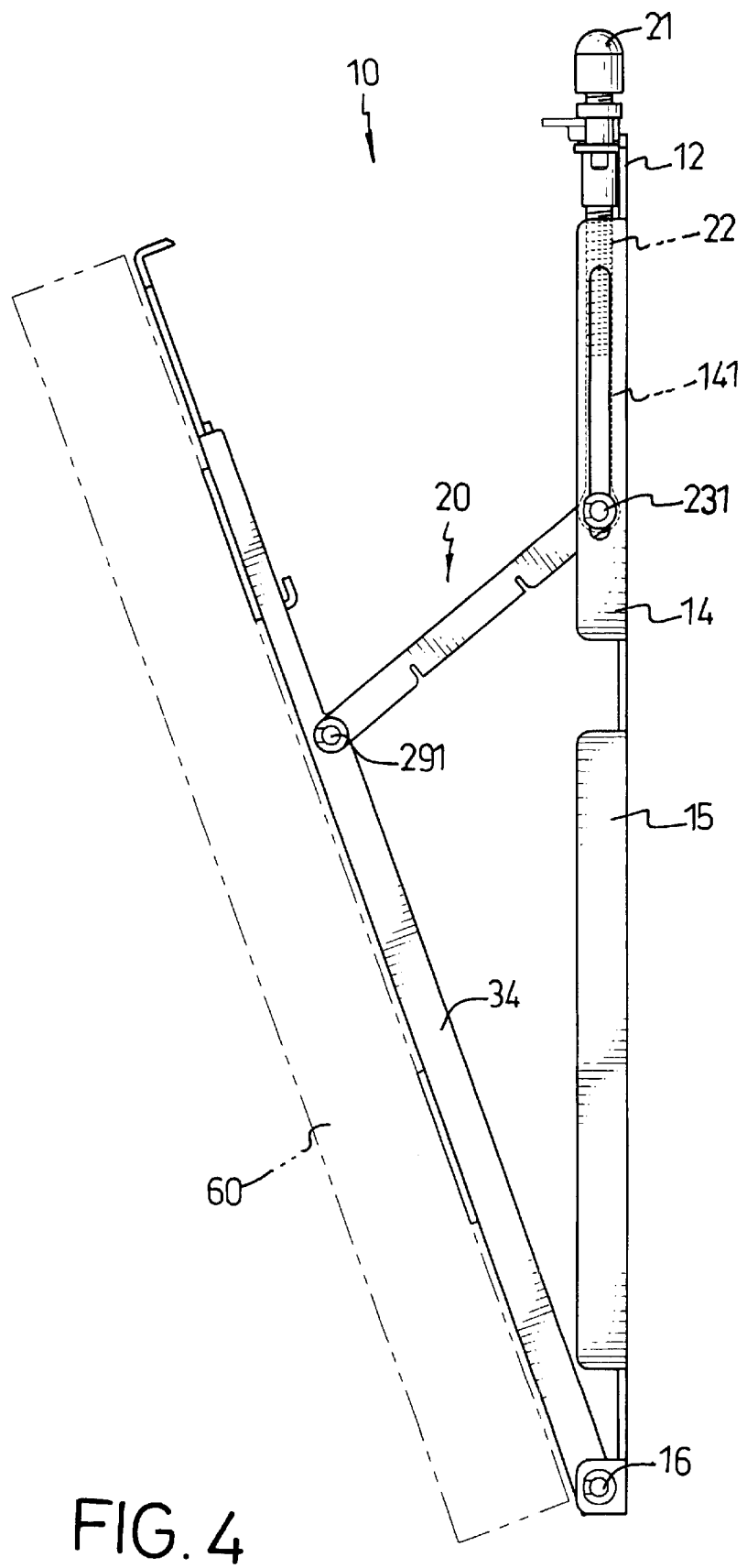
FIG. 4 is a schematic view showing the angle adjustment of the display support relative to the wall.

With reference to FIGS. 3 and 4, it is to be noted that adjusting the nut (21) is able to drive the linkage (21) to move along the confining holes (141) between the two wings (14), which initiates the pivotal movement of the pivot plates (30) relative to the securing plates (10) respectively. Meanwhile, because the display (60) is securely connected to the locking plates (40) via the engaging plates (42) and the locking plates (40) are securely connected to the pivot plates (30), the pivotal movement of the pivot plates (30) also moves the display (60).

From the foregoing description, it can be concluded that the display support of the present invention is able to support different brands and models of displays, such as LCD displays and plasma displays. Because different brands or models of the displays, most of the time, are the synonym of different sizes. With the support of the present invention, the end user is able to adjust the relative positions of the parts so as to cope with the change in size should the end user have another new set of display. Then, after the adjustment of the relative positions of the parts of the support, the support is able to be mounted at the back of the display before hooking up to the wall of the main structure. Therefore, with the universal feature of the support, after the user purchases the display support of the present invention, the user is able to provide support to any of the displays of different sizes and brands, which is quite cost effective.

it is to be understood, however, that even though numerous characteristics and advantages of the present invention have been set forth in the foregoing description, together with details of the structure and function of the invention, the disclosure is illustrative only, and changes may be made in detail, especially in mattes of shape, size, and arrangement of parts within the principles of the invention to the full extent indicated by the broad general meaning of the terms in which the appended claims are expressed.

What is claimed is:

1. A display support comprising:

a pair of securing plates each having holes so defined that the pair of securing plates are able to be securely connected to a surface, a bend formed on a top portion of the securing plate and having a central hole defined therethrough, a pair of wings extending out from opposite sides of the securing plate and each having a confining hole defined to correspond to each other, a pair of folds extending in parallel to the pair of wings and each having a pivot hole defined in a bottom of the fold so that a rivet is able to be received between the folds to correspond to the two pivot holes respectively;

a pair of pivot plates each pivotally connected to a corresponding one of the securing plates and defining therein securing holes, two first pivot holes in a bottom of a pair of baffle plates extending out in parallel from the pivot plate and two second pivot holes in a top of the pair of baffle plates, wherein the two first pivot holes correspond to the two pivot holes of the securing plate so that a first pivot is able to be secured between the folds and the baffle plates via rivets and each of the two pivot plates is pivotal relative to the corresponding securing plate;

a pair of yokes each having two first engaging holes correspond to the two confining holes, two second engaging holes to correspond to the two second pivot holes of the pivot plate, a second pivot corresponding to the two second engaging holes and the two second pivot holes so that the second pivot is able to be secured to the yoke and the pivot plate via a first securing element, a linkage extending through the two first engaging holes and received between the two wings to be limited in the confining holes by a first securing element, two threaded bolts each extending through the central hole to be screwingly connected to a nut; and a pair of locking plates each having locking holes defined in two opposite ends of the locking plate to correspond to securing holes of each of the pair of pivot plates and engaging plates adapted to be attached to a back side of a display to be hung on the locking plates, whereby the two locking plates are able to be securely connected to the pair of pivot plates due to the corresponding relationship between the locking holes and the securing holes.

2. The display support as claimed in claim 1, wherein each of the yokes has two walls and the two first engaging holes and two second engaging holes are respectively defined in a top and a bottom of the two walls.

3. The display support as claimed in claim 2, wherein each pivot plate has a cutout defined to allow the threaded bolt to extend therethrough.

\* \* \* \* \*